United States Patent [19]

Maciejczak

[11] Patent Number: 4,550,376

[45] Date of Patent: Oct. 29, 1985

[54] INSPECTION SYSTEM FOR MECHANICAL STRUCTURES

[76] Inventor: Robert A. Maciejczak, 7640 W. Devon, Chicago, Ill. 60631

[21] Appl. No.: 466,147

[22] Filed: Feb. 14, 1983

[51] Int. Cl.$^4$ ............................................... H04N 7/18
[52] U.S. Cl. .................................... 364/512; 358/100; 364/506
[58] Field of Search ............... 364/506, 512, 525, 514, 364/422; 358/100

[56] References Cited

U.S. PATENT DOCUMENTS

| | | | |
|---|---|---|---|
| 4,051,525 | 9/1977 | Kelly | 358/100 X |
| 4,131,914 | 12/1978 | Bricmont | 358/100 |
| 4,245,313 | 1/1981 | Coates | 364/422 |
| 4,319,270 | 3/1982 | Kimura et al. | 358/100 X |
| 4,414,656 | 11/1983 | Hepp | 364/422 X |
| 4,429,329 | 1/1984 | Clemens et al. | 358/100 |
| 4,463,378 | 7/1984 | Rambow | 364/422 X |

Primary Examiner—Edward J. Wise
Attorney, Agent, or Firm—Michael G. Berkman

[57] ABSTRACT

Remotely controllable and manipulable unmanned apparatus for safely inspecting, testing, viewing and for non-invasive examination and evaluation of the general condition, the state of repair, and of the quality of fabrication of mechanical structures such as large buildings, chimneys and bridges. The apparatus includes a movable carrier or platform for supporting selectable scanning, testing and sensor equipment. A drive mechanism controls the movement of the platform along a predetermined inspection path to be traversed. Auxiliary electrical components and transducers are provided for transmitting intelligence and data generated by the inspection apparatus to a remote station where the intelligence is received for review, evaluation and recordation.

40 Claims, 8 Drawing Figures

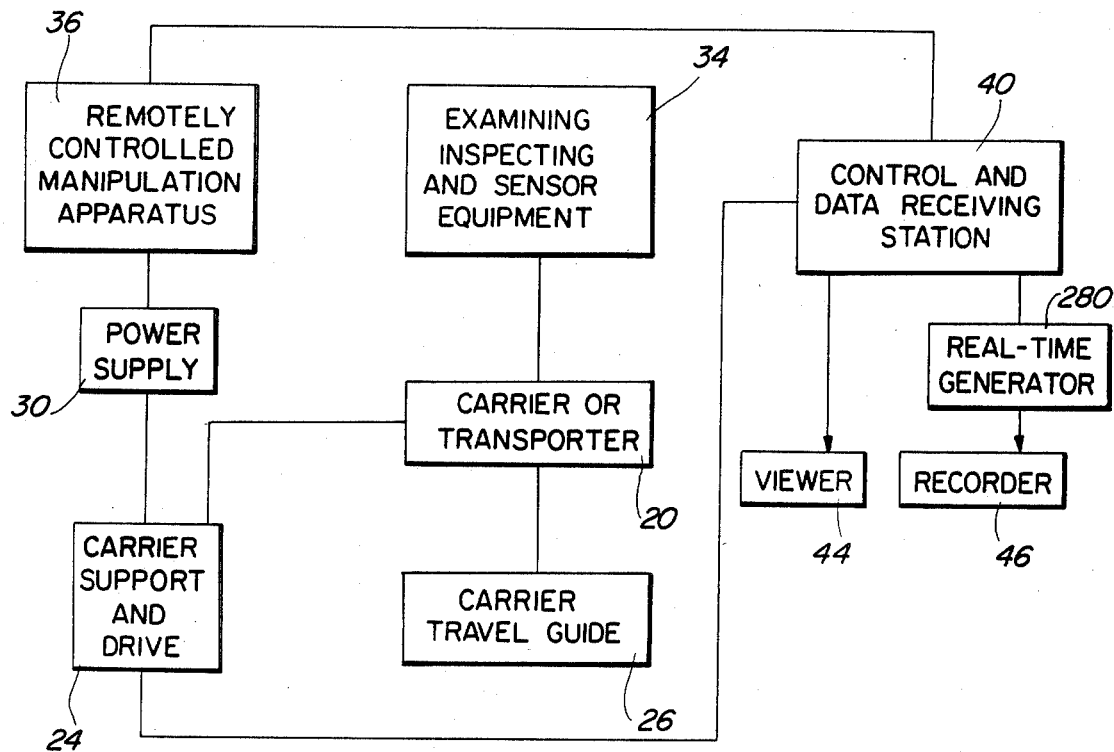
FIG-1
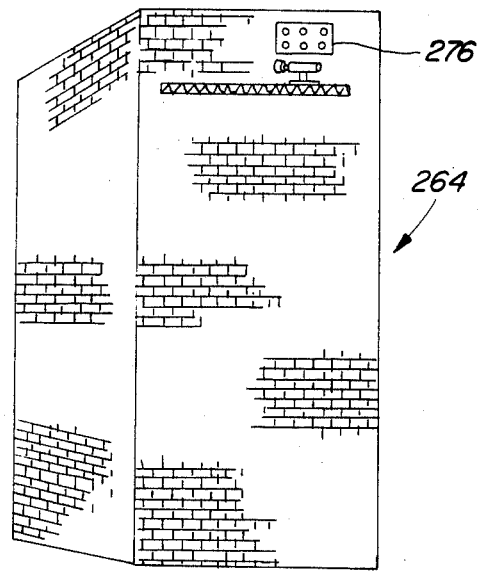
FIG-7
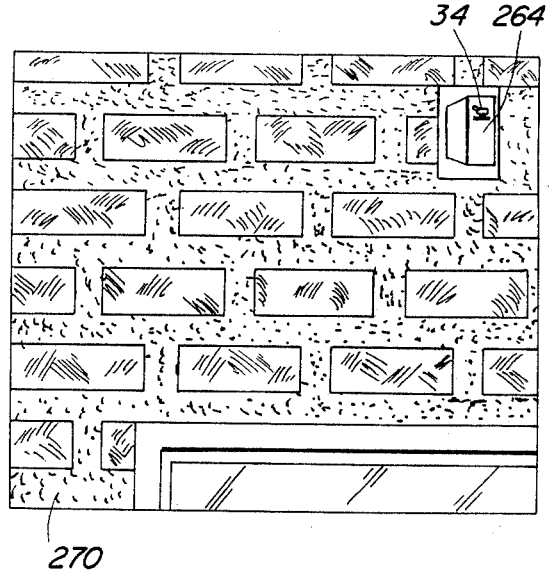
FIG-8
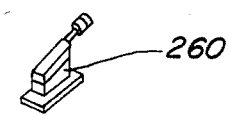

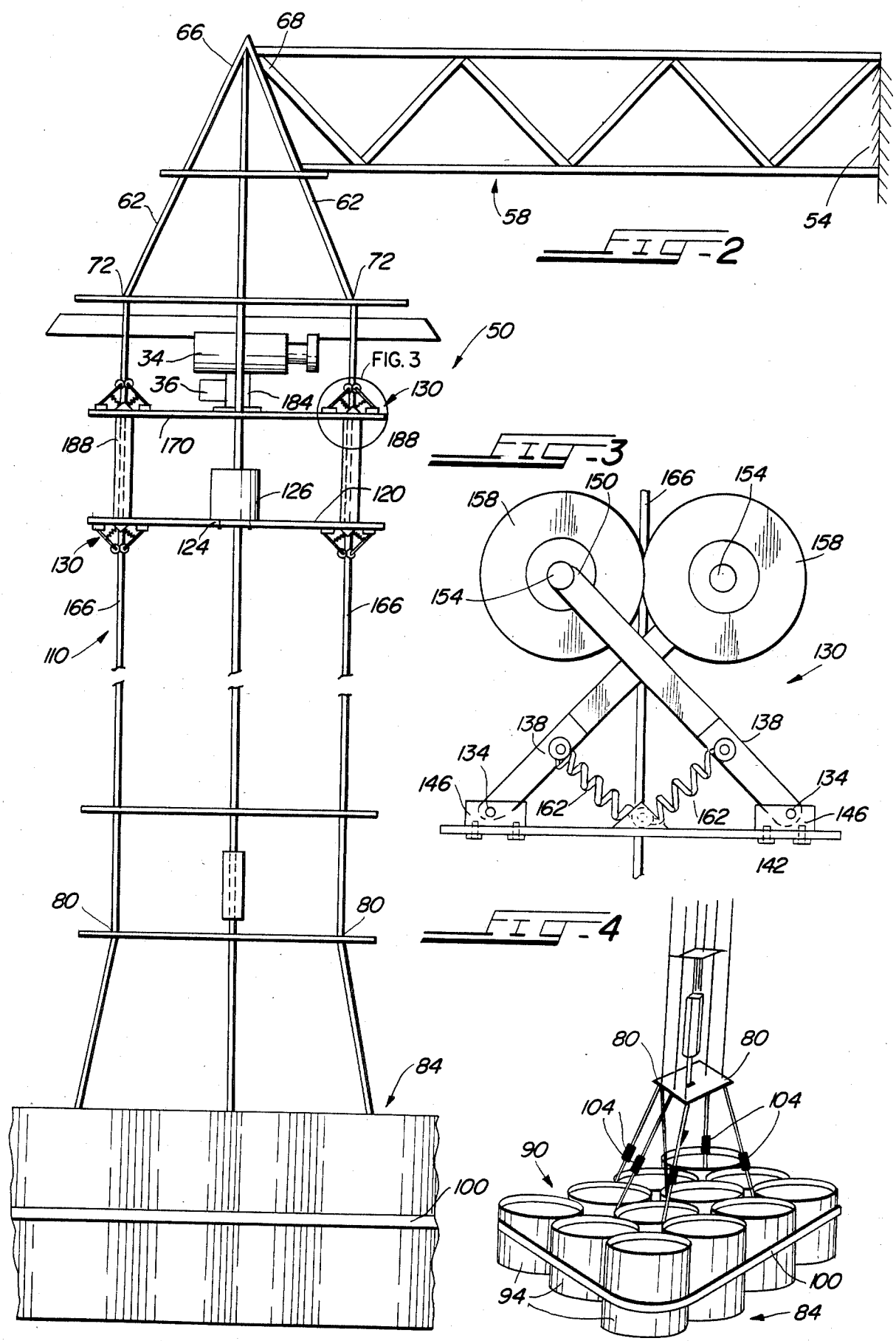

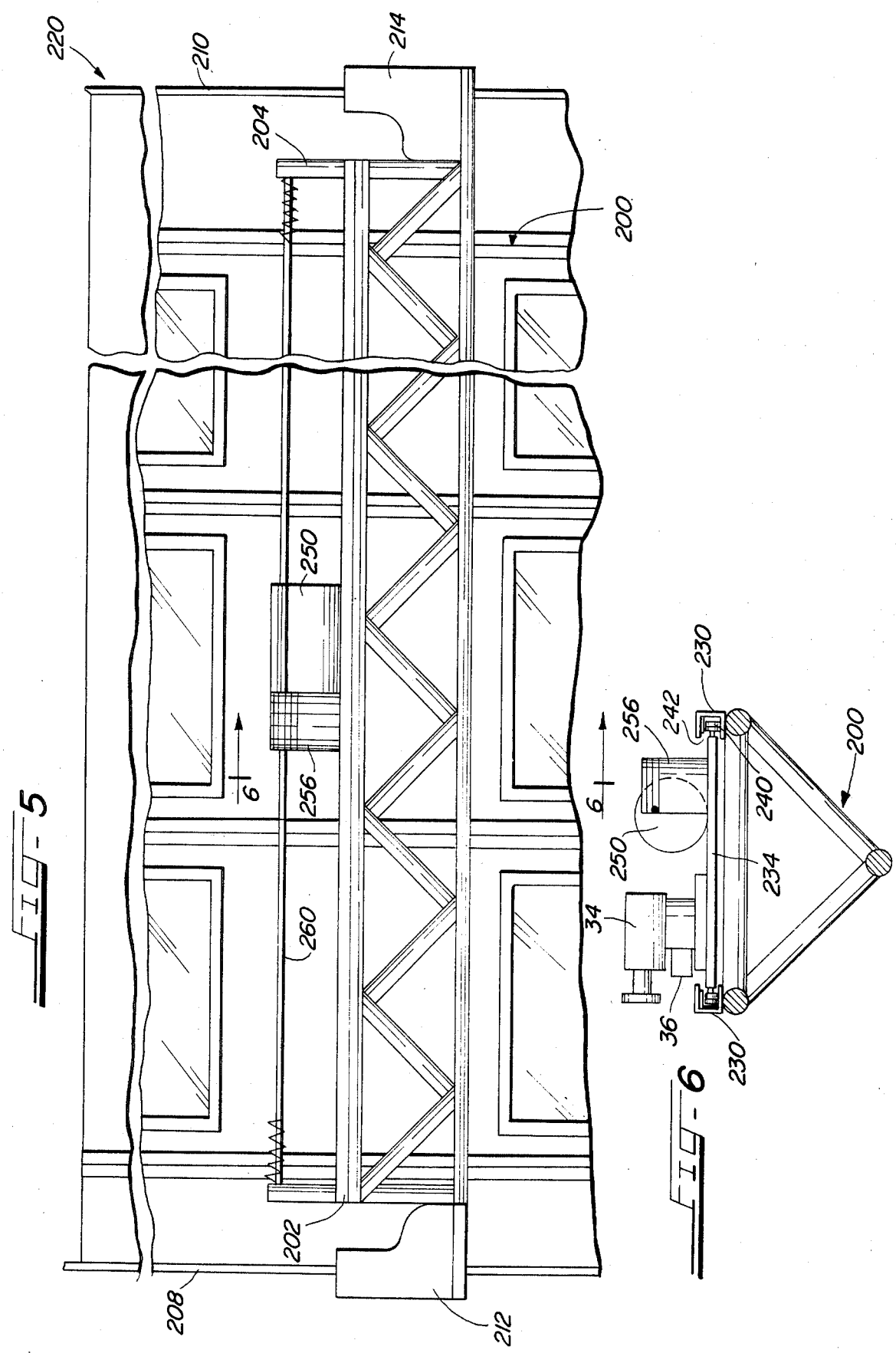

INSPECTION SYSTEM FOR MECHANICAL STRUCTURES

BACKGROUND OF THE INVENTION

The present invention relates generally to a complete, self-sufficient system for the non-destructive examination of mechanical structures. More particularly, the invention is directed to unmanned inspection and testing apparatus which is remotely controlled and which tranverses a predetermined, selectable path extending along a mechanical structures to be tracked and examined.

The critical inspection of relatively high buidings, chimneys, bridges and the like to determine the state of repair or the progress of and the quality of repair work being carried out poses a personal hazard to individuals who find it necessary physically to traverse an inspection route for direct viewing of work in progress or work necessary or completed. In addition to the personal physical hazard experienced by the observer or inspector, it is ordinarily not practical for one to make sufficiently by complete notes or entries and or fully to record his observations. As a result, such "inspections" are at best deficient in substantive respects. Moreover, no permanent or reviewable record of what the observer has noted is established.

It is, accordingly, a principal aim of the present invention to obviate the above and other shortcomings of prior art inspection techniques, and to provide an improved method and apparatus by which necessary and desirable inspections may be effectively conducted without personal hazard and with the additional benefit of achieving a permanent, reviewable record for reference and study.

It is an important feature of the present invention that mechanical structures such as high buildings may be inspected without exposure of the inspector to dangerous conditions normally inherent in the conduct of such work.

SUMMARY OF THE INVENTION

A principal object of the present invention is to provide a mechanical-electrical system, including apparatus and techniques, by which fabricated structures such as high buildings may be effectively examined and studied safely from a remote station.

Another object of the invention is to provide a versatile assemblage of viewing, sensing and testing apparatus as well as the means to cause such apparatus effectively and functionally to traverse and to bear upon difficulty accessible structural zones to be examined.

A specific feature of the assemblage of the invention is that there is provided a carrier or platform upon which test instruments and viewing equipment are supported, and means by which the instrument and equipment-carrying platform is caused, by remote control, to traverse or track the structure to be examined.

Another feature of the invention is that there is provided electrical conducting means and transducers by which information gathered by or developed by the perusal and sensing equipment is transmitted in useful form to a remote station for review, evaluation and recordation.

It is within the concept of the present invention that the viewing and testing equipment carried on the moving or movable platform includes such apparatus as infra-red sensors, sonar sensors, electro-magnetic flux generating equipment, magnetic eddy sensors, photographic equipment of various types, and X-ray apparatus.

A related feature of the invention is that each of the various types of test equipment and related apparatus carried by the movable carrier or platform may be remotely controlled and manipulated.

Yet another feature of the present invention is that all of the operations carried out by the test and viewing equipment supported on the traversing platform may be monitored at a remote station.

In one preferred embodiment of the invention, the test equipment carrying platform is supported by a truss assembly, the latter being in a physical disposition to permit, as required, both vertical travel of the support platform as well as travel along a generally horizontal mode.

A related feature of the invention is that means are provided for moving the support platform vertically along guide elements extending between the building or the structure-supported truss and an assembly anchored at the base of the building or structure.

Yet another feature of the invention is that in those instances in which a generally horizontal truss or girder is used as a support or guide for the movable platform, the assembly includes apparatus for shifting the truss or girder to any preferred or required vertical disposition so as effectively to traverse the entire face of a building or other structure.

It is an important practical feature of the invention that the examination and sensing operations conducted are of a non-destructive, non-invasive character.

Other features, objects and advantages of the present invention will become apparent from the detailed description of preferred embodiments considered in conjunction with the accompanying drawing.

BRIEF DESCRIPTION OF THE DRAWINGS

FIG. 1 is a block diagram showing a remotely controlled and operable inspection system engineered in accordance with the principles of the present invention and identifying schematically principal functional components of the system;

FIG. 2 is a front elevational view depicting schematically one preferred embodiment of a vertically traveling inspection assembly according to the invention, the entire assembly being fastened to and depending from the top of a building structure a corner-like zone of which is to be examined, and the assembly being suspended from and stabilized by a plurality of tensioned cables anchored to a ballast base consisting of ganged and weighted drums;

FIG. 3 is an enlarged view of the apparatus circled in FIG. 2 and showing a cooperating pair of opposed spring-biased, cable-engaging, shock-absorbing assemblies for ensuring stabilized, smooth travel of the platform up and down along a cable suspension system;

FIG. 4 is a perspective view of a preferred embodiment of a ballast structure, in accordance with the invention, for anchoring the vertically traveling test assembly;

FIG. 5 is a front elevational view of a second embodiment of the invention and showing a test equipment carrying platform supported on to travel along both horizontal and vertical modes, a horizontally disposed girder being shiftable vertically along a side of a building structure, the platform being movable laterally, as well, along the girder to traverse the entire facade of a structure to be examined;

FIG. 6 is a cross-sectional view taken substantially on the line 6—6 of FIG. 5 and illustrating the girder-carried rails on which the equipment-supporting platform travels along the structure to be examined;

FIG. 7 is a camera-derived broad view of the building structure being examined and showing as well the physical location and mode of the examining apparatus in use in accordance with the invention; and FIG. 8 is a close-up view of a limited zonal area under examination, and showing additionally, as an insert, a diminutive overall view of the entire structure in which the specific examination zone is found.

DESCRIPTION OF PREFERRED EMBODIMENTS

The aims and objects of the invention are realized by means of remotely controlled and manipulable inspection and testing apparatus carried on a remotely controlled supporting platform. The platform is shiftable along selectable predetermined paths delineated by auxiliary special mechanical assemblies secured to, supported on, and depending from building structures which are to be examined. The invention includes electrical components for generating intelligence and data and for transmitting the intelligence and data to a remote station for review, evaluation and recordation.

In one preferred embodiment of the invention, the instrument-carrying platform is moved along a vertically oriented inspection path by means of one or more motors drivingly coupled to a hanging, tensioned cable extending along a course to be traversed by the inspection apparatus. Additional suspension cables at corner zones of the platform and provided with spring-biased platform-coupling assemblies enhance the physical stability of the system.

The entire bank of support and guide cables is suspended, preferably from a roof-coupled truss or girder, although hooks or other rigging may also be used. At their bases, the suspension cables are anchored to ballast in the form of water-filled, drum-like container. The ballast serves controllably to tension the cables, thereby insuring smooth tracking. Suitable shock absorbing mechanisms such as an hydrollic cushion device with an optional auxilliary compression spring constitutes an additional protective feature of the invention.

In a second embodiment of the invention, the equipment carrying platform is supported on for travel along a horizontally disposed girder or truss which is in turn secured at its opposed ends by suitable suspension cables attached at the top of the structure, for example, the building, which is the subject of the contemplated inspection. This particular embodiment of the invention includes drive motors which are coupled to the suspension cables so that the platform-carrying girder can be controllably moved up and down along the face of the building or other structure. Thus, the platform-carried viewing and inspection apparatus is positionable, selectibly to bear on any zone in the entire facade of structure involved.

Referring now to the drawings, and particularly to FIGS. 1 through 4, there is shown for purposes of illustrative disclosure, and not in any limiting sense, one preferred embodiment of the invention adapted for viewing and inspecting along a vertical expanse. As indicated in the blocked diagram of FIG. 1, functionally, the inspection system includes a carrier, transporter, or platform 20, a carrier support and drive 24, including stabilizers, a carrier guide 26, a power unit or power supply 30, examining, inspecting, and sensing equipment 34, apparatus for controlling and manipulating the inspection apparatus 36, a remote control and data receiving station 40, a video-system type viewer 44, and a recorder 46. In some arrangements, two or more of the functional elements may be incorporated in a single physical structure. In other instances, there may be two or more units for controlling various modes of operation or movement.

In one preferred embodiment, as illustrated schematically in FIGS. 2 through 4, the inspection system 50 is shown in a form adapted to traverse or track a vertical course along a corner or an equivalent zone of a high building or similar structure 54. As shown, a truss assembly or girder 58 anchored to and extending outwardly of the building structure 54 supports an array of wire ropes or cables 62 fastened at their converging appex 66 to an outwardly extending end 58 of the truss 58. The cables 62 extend through an upper set of laterally spaced guide sleeve 72, depend downwardly passing through a lower set of laterally spaced guide sleeves 80, and are detachably secured to or anchored at the base 84 of the building structure 54 to a ballast assembly 90. In the exemplary apparatus shown, the ballast assembly 90 consists of 12 ganged and inter-secured, water-filled drums 94 firmly held together as a unitary mass by means of a tensioned encircling strap or band 100. Tension adjustment mechanisms 104, which may be turnbuckles or more sophisticated devices, provided with suitable indication gauges are attached to each of the cables adjacent their drum-anchored ends to facilitate equilization and balancing of tension in the cables themselves (FIG. 4).

Slidably mounted on to travel up and down along the straight vertical expanse 110 of the suspended cable assembly 62, delineating the contemplated field or zone of examination, is a platform 120. A remotely controllable servo-drive motor 126 mounted on the platform 120 is connected by an electric cable to a remote power supply (not shown). A wire rope 130 attached to extend from the top 66 of the outwardly projecting terminus of the truss 58 to the "ground" is trained or looped or wound around a driving drum, windless or spindle of the motor 126 by means of which motor-induced, frictionally transferred traction forces control movement of the platform 120 up and down along the cable assembly.

The platform 120 is stabilized, to travel in a horizontal mode, by means of special cable-engaging roller assemblies 130, each consisting of a pair of pivotally-mounted 134 cross-over struts or levers 138 bolted 142 at base anchor blocks 146 thereof to the platform 120 itself. At their opposite ends 150 the struts 138 are journaled to pins or shafts 154 carrying rotatably-mounted rollers 158. Compression springs 162 interposed and extending between the platform 120 and each pair of levers 138 and engaging the latter at positions intermediate opposed ends thereof stressingly urge the rollers into resilient abutment against opposed sides of a support cable 166 disposed therebetween and along which the rollers 158 travel as the platform 120 moves up and down. Preferably, four such strut assemblies (for a rectangular platform), each engaging a separate cable, are employed for each platform.

Optionally, in addition to the drive motor 126, the platform 120 may also be used to carry the test and examination equipment employed in accordance with the practice of the invention. However, in the particular exemplary embodiment of the invention depicted in FIG. 2, a separate platform 170 is used. The testing and examining apparatus 34 contemplated includes one or more of a diverse retinue of optional devices including infra-red and sonar sensors, electromagnetic flux generators, magnetic eddy sensors, photo equipment, and X-ray apparatus. The specific tests contemplated will dictate the selection of test apparatus to be employed. In each case, the apparatus is mounted on a combination turntable and tilt adjustment base 184 so that, through electrical controls operated from a physically remote station 40, the test or viewing equipment may be movably directed and may be brought to focus, by manipulation controls 36, upon selectable zones along the inspection path traversed. The data and information obtained are delivered in a useful form for viewing 44 and/or recordation 46, as desired.

The second platform 170 which is generally of a construction similar to that of the motor-carrying platform 120, is spaced upwardly of the latter and is supported thereabove by means of interposed, pipe-like elements 188 sleeved over support cables 166. The equipment-carrying platform 170 is stabilized by roller assemblies 130 as in the case of the motor-supported platform 120, such a stabilizer as previously described being shown in the enlarged detail in FIG. 3.

In accordance with the practice of the invention, the remote automated control station 40 is equipped with manually manipulable as well as electronic transducers and physical fixtures which act in conjunction with electrically coupled servo or selsyn-type motors and controls at the viewing platform 170. Thus, the sensors and viewers, for example, a TV camera, at the examining locus, may be rotated in azimuth and may be adjusted in tilt or elevation to bear on any selected zone to be viewed and examined. Additionally, a zoom lens and the iris of the lens may be controlled for optimum focus and light input. Other forms of telemetry may be used simultaneously with or independently of the TV camera to provide additional useful information and data. All of the data and information developed are reviewable and recordable at the remote control and receiving station 40.

It will be appreciated that the apparatus described obviates the need for individuals to make repeated and extensive personal trips to elevated locations on highrise buildings and the like to check the state of repair of such relatively inaccessible sites and to determine the quality of work in progress or contemplated. Any such needed studies and evaluations are carried out safely and efficiently, and more effectively, using the method and apparatus of the invention. Moreover, resort to the apparatus and method of the invention has the added advantage of providing a reviewable, permanent record for study, evaluation, and for future reference. Referring now to FIGS. 5 and 6, there is shown a second embodiment of the inspection apparatus and ancillary equipment according to the present invention. As depicted schematically in FIG. 5, the apparatus includes a girder or truss 200 which is suspended at each of opposed lateral ends 202 and 204 by cables 208 and 210 positively engaged with respective drive motors 212 and 214. The truss 200 itself is of high-strength, lightweight construction and may be fabricated from either tubular or angle stock, preferably of aluminum or magnesium alloys. The truss 200 is assembled in modules so that any desired width may be easily achieved.

The upper ends of the cables 208 and 210 are secured at the top of the building wall 220 by hooks or similar anchors (not shown). The motors 212 and 214, fed by electric power lines in the usual manner, are provided with remotely operable controls so that an operator at the ground-based control station 40 may track the structure to be examined by elevating and lowering the truss 200 along the face of the building, as previously described.

The truss 200 carries a pair of horizontally extending rails 230 (FIG. 6). A platform 234 is mounted on the rails 230 for travel therealong. As best seen in FIG. 6, the platform 234 includes supporting rollers 240 which ride in generally U-shaped channels 242 to ensure smooth operating characteristics.

The platform is powered for lateral traverse by means of a remotely controllable motor 250 coupled through a spindle or driving drum 256 to a fixed cable 260 extending across the expanse of the truss 200. A TV camera or other test or inspection unit 34, with remote controls, is carried by the platform 234 so that, through the combination of the elevating and lowering motors 212 and 214 and the lateral movement controls motor 250, the platform-carried inspection and test equipment may be controllably shifted to and directed to bear upon any selectable zone embracing the entire facade encompassed by the travel of the platform 234. In effect, the platform 234 may be controllably shifted vertically with and laterally across the truss 200, to any desired coordinate.

In a preferred embodiment of the invention, in addition to the inspection and viewing primary camera 34 carried on the traveling platform 170 or 234, there is provided a secondary or orientation camera 260 conveniently positioned at the base and somewhat removed from the structure 264 being studied. The secondary camera 260 is connected electrically to operate in synchronization with the primary camera 34. However, the fields of view and the roles of the two cameras differ.

The primary camera 34 is focused to bear, at any time, upon a relatively limited inspection zone or viewing field 270 (FIG. 8) for definitive examination of details in the structure under study. This camera 34 may also be "zoomed" in to focus on even a smaller special area of immediate concern, for example, a caulk joint. In contrast, the secondary camera 260 embraces a view encompassing an entire facade or a corner structure of the "building" 264 being examined (FIG. 7). This secondary camera 260 includes within its perview and scans the primary camera 34 as the latter traverses its inspection path. The localized as well as the overall scenes viewed by the cameras 34 and 260 may be reproduced and examined individually on the monitoring video screen or viewer 44, and may be recorded. Additionally and optionally, the two scenes may be "superimposed" on the viewing screen 44, as indicated in FIG. 8, and may be so recorded.

Auxiliary apparatus serving further to effectuate the aims of the invention include indicators, for example, lights or strobe lights arrayed as a bank of lights 276 adjacent to and operatively and responsively coupled with the inspection camera 34. The lights, 276, which may be of different colors or which may be lights (or a light) energized or pulsed in various distinctive and distinguishable patterns, serve to indicate, in real time, the orientational attitude or the precise direction in which the lens of the inspection camera 34 is being aimed, that is, to the left, straight ahead, or to the right, and up or down.

Useful information can be provided and transmitted or relayed by using, for example, six lights, as shown schematically in FIG. 7. At any given time during operation of the inspection camera 34, the exact physical disposition, aiming mode, or orientation of the camera 34 will be known and may be correlated with the overall, all-inclusive view and with the close-up view. The visual data and information developed provide both a precise identification of the general locus of examination as well as a designation of the definitive zonal area being viewed and examined. Location, orientation, and field will be fully established, so that the exact incremental sector under examination will be known, in real time, and for later reference. The information may be preserved by recording, and may later be recalled for reference and for critical review.

Additional refinements contributing to the versatility of the invention include a real time generator or clock 280 which may be interposed to communicate between the control and data-receiving station 40 and the recorder 46. An auxiliary transducer or computer device may be used for converting one form of received or generated data or energy such as transmitted microwave energy into a form more susceptible of viewing and recording.

While there have been described what are considered to be preferred embodiments of the invention, it will be obvious to those skilled in the art that various changes and modifications may be made without departing from the invention, and it is intended that the appended claims cover all such modifications as fall within the spirit and scope of the invention.

What is claimed is:

1. Apparatus for perusal and for rigorous inspection of architectural and of mechanical structures at a remote site and for examination of structures and architecture to determine state of repair, construction parameters, quality of restorative and corrective work required and in process, to establish building and repair specifications and standards, and to determine compliance therewith, said apparatus comprising
controllably movable carrier means for support of scanning, testing and sensor equipment thereon,
selectively positionable, elongated guide means for supporting said carrier means and for delineating an inspection path to be traversed by said carrier means,
drive means for controlling movement of said carrier means along a selectable predetermined inspection path correlated with a course of travel defined by said guide means,
electrical means for transmitting intelligence received by scanning, testing and sensor equipment supported on said carrier means,
receptor means remote from scanning, testing and sensor equipment on said carrier means for receiving intelligence transmitted by said electrical means,
said receptor means including transducer means for converting the intelligence received from scanning, testing and sensor equipment on said carrier means into a form susceptible of perception and evaluation.

2. The structure as set forth in claim 1 and further comprising anchor means for securing said guide means at spaced securement loci in a functionally stable disposition.

3. The apparatus as set forth in claim 1 and further comprising scanning, testing and sensor means for inspecting, for testing, and for perceiving structural components and structural features along a path traversed by said carrier means.

4. The apparatus as set forth in claim 3 and further comprising fastener means securing said scanning, testing and sensor means to said carrier means for safe travel therewith.

5. The apparatus as set forth in claim 3 wherein said scanning, testing and sensor means includes a video camera.

6. The apparatus as set forth in claim 5 wherein said scanning, testing and sensor means includes positioning means for adjusting a field of view of said video camera.

7. The apparatus as set forth in claim 5 wherein said video camera includes lens means for viewing images therethrough and wherein said scanning, testing and sensor means includes electrically responsive camera adjusting means for remotely controlling pan and tilt of said camera, and aperture of said lens means.

8. The apparatus as set forth in claim 5 and further comprising means for recording picture images generated by said video camera.

9. The apparatus as set forth in claim 5 and further comprising a monitor television screen for displaying image producing signals derived from said video camera.

10. The apparatus as set forth in claim 9 and further comprising means for recording picture images displayed on said monitor television screen.

11. The apparatus as set forth in claim 3 wherein said scanning, testing and sensor means including non-destructive examining means for generating data pertaining to examination effected by said scanning, testing and sensor means.

12. The apparatus as set forth in claim 11 and further comprising recording means for recording data generated by said examining means as a result of operation thereof.

13. The apparatus as set forth in claim 3 wherein said scanning, testing and sensor means includes magnetic flux generating means for inducing eddy currents in a structure to be tested, and means to detect impedance variations caused by the presence or absence of a mechanical defect in the structure being tested.

14. The apparatus as set forth in claim 3 wherein said scanning, testing and sensor means includes positioning means for adjusting a field of view of said video camera.

15. The apparatus as set forth in claim 14 wherein said guide means comprises cable means for movement of said carrier means slidably and restrainably therealong, and wherein said anchor means comprise truss means, and means securing said truss means to said mechanical structure adjacent a reference position thereof.

16. The structure as set forth in claim 15 and further comprising means fastening said truss means to one terminal of said cable means, ballast means for tensioning said cable means, and means fastening said ballast means to an opposite terminal of said cable means, said cable means extending between and being maintained in tension by said truss means and said ballast means.

17. The apparatus as set forth in claim 16 and further comprising shock-absorbing means in a line of travel of said carrier means, said shock-absorbing means being interposed between said truss means and said ballast means to dissipate gravitational forces acting upon said carrier means during travel of said carrier means from said truss means toward said ballast means.

18. The apparatus as set forth in claim 3 and further comprising anchor means for securing said guide means at spaced securement loci in a functionally stable disposition.

19. The structure as set forth in claim 3 wherein said scanning, testing and sensor means comprises primary camera means for definitive viewing of structural components and structural features along a path traversed by said carrier means, and further comprising secondary camera means distinct from said primary camera means during travel along an inspection path traversed thereby.

20. The apparatus as set forth in claim 19 wherein said secondary camera means includes sensor means operable for viewing broadly an expanse of a structure as the structure is traversed by said primary camera means, and display means for reporducing images seen by said primary camera means and by said secondary camera means 21. The apparatus as set forth in claim 20 wherein said display means includes means for reproducing simultaneously, and as a coordinated composite, images seen by both said primary camera means and said secondary camera means.

22. The apparatus as set forth in claim 21 wherein said display means comprises a video screen and wherein images seen by both said primary camera means and said secondary camera means both appear on said video screen simultaneously to show both the area of the structure being examined and also the precise limited zone within that area.

23. The apparatus as set forth in claim 3 wherein said scanning, testing and sensor means includes a camera, and further comprising means for adjusting a field of view of said camera, and viewing-field-indicator means coupled to said camera for indicating at any given time a then existing directional attitude of said camera correlated with a specific limited field being then viewed by said camera.

24. The apparatus as set forth in claim 23 wherein said viewing field indicator means comprises signal means and means coupling said signal means to said camera for automatic selective actuation thereof in predetermined distinctive correlation with a specific orientational attitude.

25. The apparatus as set forth in claim 24 wherein said signal means comprise light means and means coupled with said camera for effecting illumination patterns of said light means, said illumination patterns being indicative of selectible viewing modes of said camera.

26. The apparatus as set forth in claim 1 and further comprising secondary perceiving apparatus and receptor means remote from said apparatus and separate from said receptor to provide perspective perception of said apparatus in its scanning, testing and sensing mode.

27. The apparatus as set forth in claim 1 wherein said transducer means includes means for producing video images.

28. The apparatus as set forth in claim 1 wherein said receptor means includes a monitor television for displaying images.

29. The apparatus as set forth in claim 1 wherein said drive means comprises electrical motor means.

30. The apparatus as set forth in claim 1 wherein said guide means comprise a plurality of spaced, co-extensive, parallelly disposed cable means for delineating an inspection path to be traversed by said carrier means.

31. The apparatus as set forth in claim 1 wherein said apparatus includes rail means for travel of said carrier means therealong.

32. The apparatus as set forth in claim 31 wherein said rail means extend in a generally horizontal mode.

33. The apparatus as set forth in claim 1 wherein said guide means is disposed in a generally horizontal mode for movement of said carrier means therealong.

34. The apparatus as set forth in claim 33 and further comprising means for shifting said guide means to provide generally horizontally extending inspection paths disposed along generally parallel, vertically-spaced sweeps defined by scanning and sensor means traversing said guide means.

35. The apparatus as set forth in claim 1 wherein said guide means is disposed in a generally vertical mode for movement of said carrier means therealong.

36. The apparatus as set forth in claim 1 wherein said guide means includes elongated truss means for supporting said carrier means and for defining a path of travel of said carrier means therealong.

37. The apparatus as set forth in claim 36 and further comprising cable means for supporting said truss means for traversing travel of said carrier means therealong and along a mechanical structure to be examined.

38. The apparatus as set forth in claim 1 wherein said carrier means comprises a platform for support of testing, scanning and sensor equipment thereon.

39. The apparatus as set forth in claim 1 and further comprising gauge means for facilitating adjustment and equilibration of tension in said guide means.

40. The apparatus as set forth in claim 1 and further comprising a real-time generator for designating and recording the time of inspection operations carried out.

* * * * *